*J. Tramblie,*
Washing Machine.
No. 93,566. Patented Aug. 10. 1868.
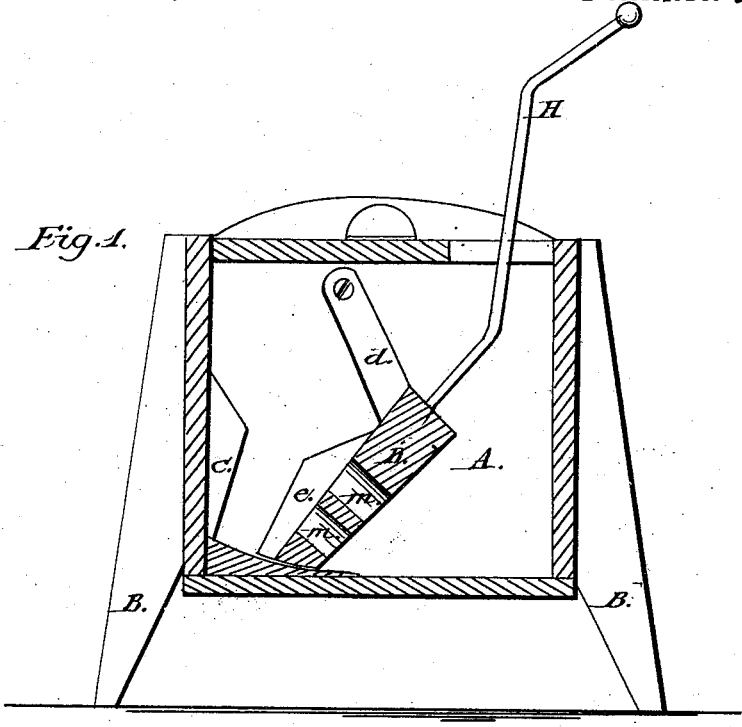
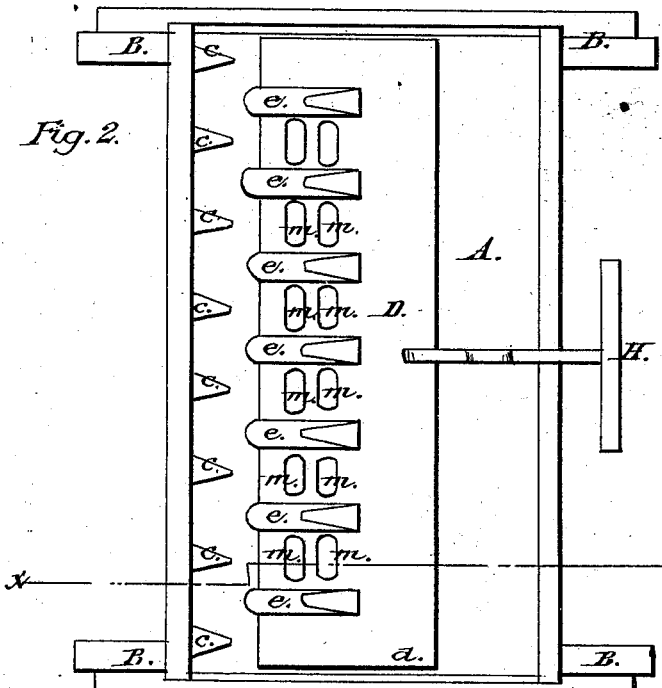
Witnesses:
C. A. Pettit
A. M. Panner
Inventor:
J. Tramblie
PER.
Munn & Co.
attorneys

United States Patent Office.

JONAS TRAMBLIE, OF SANDWICH, ILLINOIS.

Letters Patent No. 93,566, dated August 10, 1869.

IMPROVEMENT IN WASHING-MACHINES.

The Schedule referred to in these Letters Patent and making part of the same.

*To all whom it may concern:*

Be it known that I, JONAS TRAMBLIE, of Sandwich, in the county of De Kalb, and State of Illinois, have invented a new and improved Washing-Machine; and I do hereby declare that the following is a full, clear, and exact description of the construction and operation of the same, reference being had to the accompanying drawings, making a part of this specification, in which—

Figure 1 is a section through line $x\ x$ of fig. 2.

Figure 2 is a top view.

The object of this invention is to provide for public use an improved washing-machine, which shall be simple in construction, cheap, durable, easily cleansed and dried, and convenient of operation; to this end, The invention consists in the employment of a tub or tank, with side ribs and a ribbed and perforated swinging beater, provided with a handle, all constructed and arranged as is shown by the drawings, and as I will now more particularly describe.

In the drawings—

A represents the tub or tank.

B B, the legs which support the tank.

$c\ c$, vertical ribs, parallel to each other, and attached to the inner side of the tank.

D, a beater, hung upon pivoted arms $d\ d$, provided with a handle, H, and operating in connection with the side ribs $c\ c$, it being provided, on the side next to them, with similar ribs $e\ e$, arranged so as to come between the ribs $c\ c$, and also with series of perforations $m\ m$, arranged between the ribs $e\ e$ and opposite to the ribs $c\ c$, as shown in fig. 2.

The tank is to be partially closed with a cover, T, which covers all that portion of it between the beater and the ribbed side of the tank.

Its operation is as follows:

The tub or tank is partially filled with water, and the clothes are placed between the beater and the ribs $c\ c$.

The beater is then rocked by means of the handle H, and the clothes alternately compressed between the beater and the stationary ribs. A portion of the water expressed from them flows back through the holes $m\ m$, the rest escaping over and under the beater, and the water being prevented from spattering out of the tub by means of the cover T.

This process will in a short time thoroughly purify the clothes without tearing or otherwise injuring them.

Having thus described my invention,

What I claim as new, and desire to secure by Letters Patent, is—

The beater D, having the holes $m\ m$ and the ribs $e\ e$, when hung on swinging arms $d\ d$, provided with a handle, H, and arranged in a tub, A, having vertical ribs $c\ c$, arranged with relation to the ribs $e\ e$ and holes $m\ m$, as shown, for the purposes herein set forth.

JONAS TRAMBLIE.

Witnesses:
S. B. STINSON,
JULIUS TRAMBLIE.